(12) United States Patent
Matsumoto et al.

(10) Patent No.: US 11,770,509 B2
(45) Date of Patent: Sep. 26, 2023

(54) METHOD FOR CONTROLLING PROJECTOR, PROJECTOR, AND DISPLAY SYSTEM

(71) Applicant: SEIKO EPSON CORPORATION, Tokyo (JP)

(72) Inventors: Morio Matsumoto, Matsumoto (JP); Takaaki Ozawa, Shiojiri (JP); Makoto Kobayashi, Matsumoto (JP); Takeo Koshiba, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 118 days.

(21) Appl. No.: 17/546,890

(22) Filed: Dec. 9, 2021

(65) Prior Publication Data

US 2022/0191445 A1 Jun. 16, 2022

(30) Foreign Application Priority Data

Dec. 10, 2020 (JP) ................ 2020-204799

(51) Int. Cl.
| | |
|---|---|
| *H04N 9/31* | (2006.01) |
| *G03B 21/14* | (2006.01) |
| *H04N 5/74* | (2006.01) |
| *G06F 21/31* | (2013.01) |

(52) U.S. Cl.
CPC ............ *H04N 9/3194* (2013.01); *H04N 5/74* (2013.01); *G06F 21/31* (2013.01)

(58) Field of Classification Search
CPC .............. H04N 9/3194; H04N 9/3179; H04N 21/4753; G03B 21/14; H04B 5/0031
See application file for complete search history.

(56) References Cited

U.S. PATENT DOCUMENTS

| | | | |
|---|---|---|---|
| 2016/0134831 A1* | 5/2016 | Dixit | ................. H04N 21/4781 386/231 |
| 2018/0024796 A1 | 1/2018 | Hamakawa | |

FOREIGN PATENT DOCUMENTS

JP 2018-013951 A 1/2018

* cited by examiner

*Primary Examiner* — Ryan D Howard
(74) *Attorney, Agent, or Firm* — Oliff PLC (57) ABSTRACT

A method for controlling a projector, the method comprising: determining, when the projector having an RF tag is started up, whether a setting that permits a process of reading out setting information stored in the RF tag and configuring a setting on the projector based on the setting information is configured or not; determining whether a password requested to be inputted to an information processing device is at an initial value or not, when the setting information is written into the RF tag from the information processing device; and notifying a user of a warning message when it is determined that the setting that permits the process is configured and it is determined that the password is at the initial value.

8 Claims, 5 Drawing Sheets

METHOD FOR CONTROLLING PROJECTOR, PROJECTOR, AND DISPLAY SYSTEM

The present application is based on, and claims priority from JP Application Serial Number 2020-204799, filed Dec. 10, 2020, the disclosure of which is hereby incorporated by reference herein in its entirety.

BACKGROUND

1. Technical Field

The present disclosure relates to a method for controlling a projector, a projector, and a display system.

2. Related Art

For an electronic device having an NFC tag, a technique of setting various kinds of information in the electronic device via the NFC tag is disclosed.

For example, JP-A-2018-13951 describes that, in a printer where setting information can be rewritten via an NFC tag, writing of setting information to the NFC tag is not permitted when the authentication of a password has failed in a state where a password for writing setting information to the NFC tag is set.

However, in the technique described in JP-A-2018-13951, setting information that is not desired by the user can be written when a proper password is not set. Also, setting information that is not desired by the user can be used for the setting on a projector.

SUMMARY

A method for controlling a projector according to an aspect of the present disclosure is a method for controlling a projector having an RF tag. The method includes: when the projector is started up, determining whether a setting that permits a kitting process of reading out setting information stored in the RF tag and configuring a setting on the projector based on the setting information is configured or not; determining whether a password requested to be inputted to an information processing device is at an initial value or not, when the setting information is written into the RF tag from the information processing device; and notifying a user of a warning message indicating that setting information can be written into the RF tag by another user, when it is determined that the setting that permits the kitting process is configured and it is determined that the password is at the initial value.

A projector according to another aspect of the present disclosure is a projector including an RF tag and a control unit. The control unit, when the projector is started up, determines whether a setting that permits a kitting process of reading out setting information stored in the RF tag and configuring a setting on the projector based on the setting information is configured or not. The control unit determines whether a password requested to be inputted to an information processing device is at an initial value or not, when the setting information is written into the RF tag from the information processing device. The control unit notifies a user of a warning message indicating that setting information can be written into the RF tag by another user, when it is determined that the setting that permits the kitting process is configured and it is determined that the password is at the initial value.

A display system according to still another aspect of the present disclosure is a display system including a projector that has an RF tag and a control unit, and an information processing device that can communicate with the RF tag. The control unit, when the projector is started up, determines whether a setting that permits a kitting process of reading out setting information stored in the RF tag and configuring a setting on the projector based on the setting information is configured or not. The control unit determines whether a password requested to be inputted to the information processing device is at an initial value or not, when the setting information is written into the RF tag from the information processing device. The control unit notifies a user of a warning message indicating that setting information can be written into the RF tag by another user, when it is determined that the setting that permits the kitting process is configured and it is determined that the password is at the initial value.

DESCRIPTION OF EXEMPLARY EMBODIMENTS

An embodiment will now be described with reference to the drawings.

Figure 1:
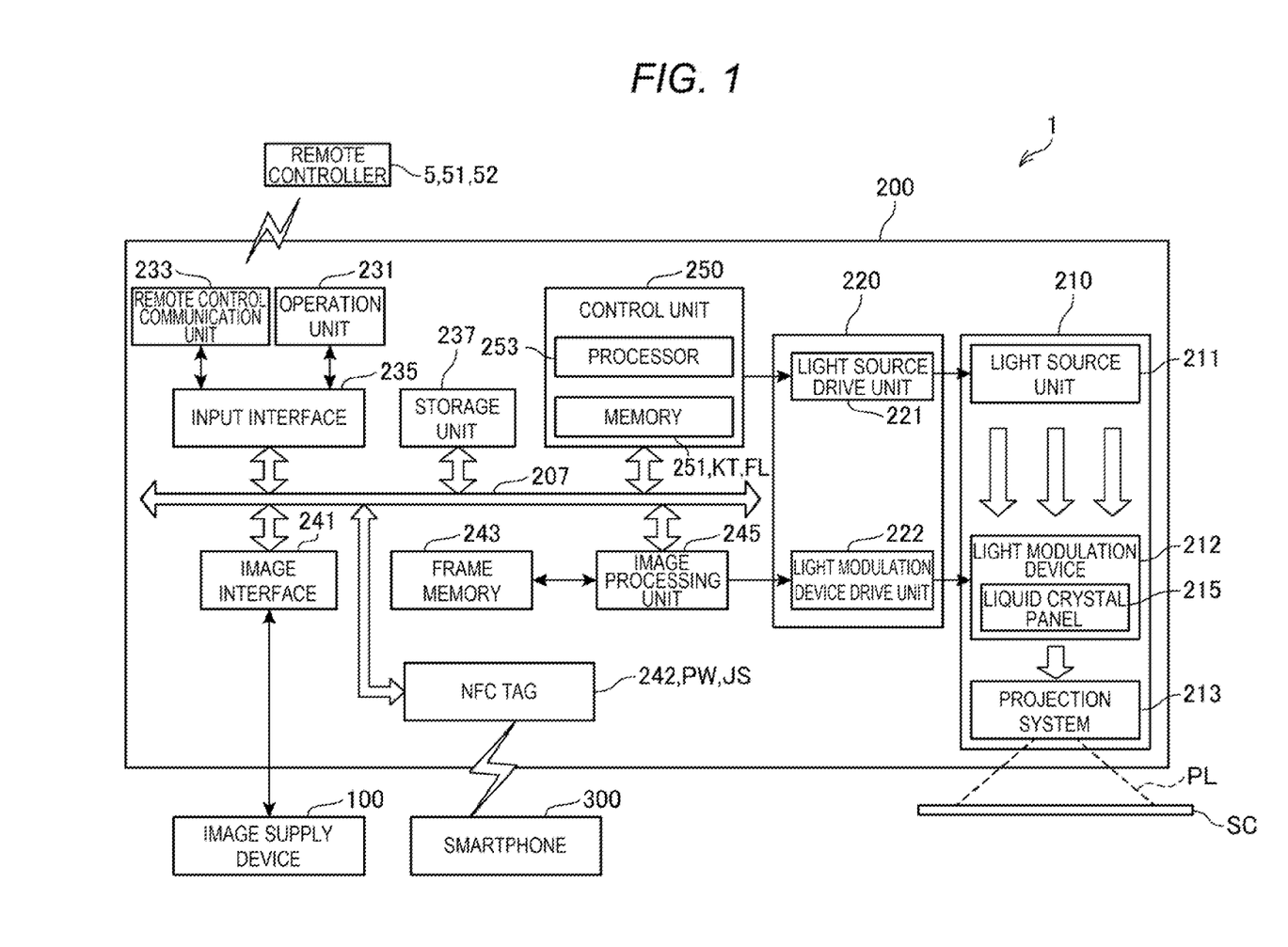
FIG. 1 shows an example of the configuration of a projector according to an embodiment.

As shown in FIG. 1, a display system 1 has an image supply device 100, a projector 200, and a smartphone 300.

The image supply device 100 is formed, for example, of a personal computer or the like and supplies an image to the projector 200. The image supply device 100 plays back, for example, a DVD (digital versatile disc) and supplies dynamic image information to the projector 200.

The projector 200 projects image light PL toward a screen SC and thus displays a projection image on the screen SC. The projector 200 has an NFC (near-field communication) tag 242.

The smartphone 300 writes setting information JS into the NFC tag 242 arranged in the projector 200.

The smartphone 300 is equivalent to an example of an □information processing device□.

The NFC tag 242 is equivalent to an example of an RF (radio-frequency) tag.

FIG. 1 shows an example of the configuration of the projector 200 according to this embodiment.

As shown in FIG. 1, the projector 200 has a projection unit 210 and a drive unit 220 driving the projection unit 210. The projection unit 210 forms an optical image and projects the image onto the screen SC.

The projection unit 210 has a light source unit 211, a light modulation device 212, and a projection system 213. The drive unit 220 has a light source drive unit 221 and a light modulation device drive unit 222.

The light source unit 211 has a light source. The light source unit 211 has, for example, a lamp light source such as a halogen lamp, a xenon lamp or an ultra-high-pressure mercury lamp, or a solid-state light source such as an LED (light-emitting diode) or a laser light source.

The light source unit 211 may have a reflector and an auxiliary reflector that guide light emitted from the light source to the light modulation device 212. The light source unit 211 may also have a lens group for enhancing optical characteristics of projection light, a polarizer, or a dimmer element reducing the amount of light of the light emitted from the light source on the path to the light modulation device 212, or the like.

The light source drive unit 221 is coupled to an internal bus 207 and turns on and off the light source of the light source unit 211 in response to an instruction from a control unit 250 similarly coupled to the internal but 207.

The light modulation device 212 has, for example, three liquid crystal panels 215 corresponding to the three primary colors of R, G, and B. R represents red. G represents green. B represents blue. That is, the light modulation device 212 has a liquid crystal panel 215 corresponding to R color light, a liquid crystal panel 215 corresponding to G color light, and a liquid crystal panel 215 corresponding to B color light.

The light emitted from the light source unit 211 is split into three color lights of R, G, and B, which then become incident on the corresponding liquid crystal panels 215, respectively. Each of the three liquid crystal panels 215 is a transmission-type liquid crystal panel, which modulates light transmitted therethrough and thus generates the image light PL. The image lights PL transmitted and modulated through the liquid crystal panels 215 are combined together by a light combining system such as a cross dichroic prism and the combined light is emitted to the projection system 213.

In this embodiment, a case where the light modulation device 212 has the transmission-type liquid crystal panels 215 as light modulation elements is described. However, this is not limiting. The light modulation element may be a reflection-type liquid crystal panel or a digital micromirror device.

The light modulation device 212 is driven by the light modulation device drive unit 222. The light modulation device drive unit 222 is coupled to an image processing unit 245.

Image data corresponding to the primary colors of R, G, and B is inputted to the light modulation device drive unit 222 from the image processing unit 245. The light modulation device drive unit 222 converts the inputted image data to a data signal suitable for the operation of the liquid crystal panels 215. Based on the converted data signal, the light modulation device drive unit 222 applies a voltage to each pixel in the liquid crystal panels 215 and thus draws an image on each liquid crystal panel 215.

The projection system 213 has a lens and a mirror or the like causing the incident image light PL to form an image on the screen SC. The projection system 213 may also have a zoom mechanism for enlarging or reducing the image projected on the screen SC, and a focus adjustment mechanism for adjusting the focus, or the like.

The projector 200 also has an operation unit 231, a remote control communication unit 233, an input interface 235, a storage unit 237, an image interface 241, the NFC tag 242, a frame memory 243, the image processing unit 245, and the control unit 250. The input interface 235, the storage unit 237, the image interface 241, the NFC tag 242, the image processing unit 245, and the control unit 250 are coupled in such a way as to be able to communicate data with each other via the internal bus 207.

The operation unit 231 has various buttons and switches provided at a surface of the casing of the projector 200, generates an operation signal corresponding to an operation on these buttons and switches, and outputs the operation signal to the input interface 235. The input interface 235 has a circuit outputting the operation signal inputted from the operation unit 231, to the control unit 250.

The remote control communication unit 233 performs infrared communication with a remote controller 5. The remote controller 5 has a touch panel 51 and various operation keys 52.

The touch panel 51 has an LCD (liquid crystal display) and a touch sensor. The LCD displays various images including a guidance screen 400 shown in FIG. 2 and a password setting screen 500 shown in FIG. 3.

The remote controller 5 receives an infrared signal from the remote control communication unit 233, decodes the infrared signal into an image signal, and displays an image corresponding to the image signal on the LCD of the touch panel 51.

The touch sensor is formed as integrated with the display surface of the LCD and accepts a touch operation by the user. The operation key 52 accepts an operation by the user.

The remote controller 5 encodes an operation signal corresponding to the operation accepted by the touch sensor and the operation key 52 of the touch panel 51 into an infrared signal and transmits the infrared signal to the remote control communication unit 233.

Figure 2:
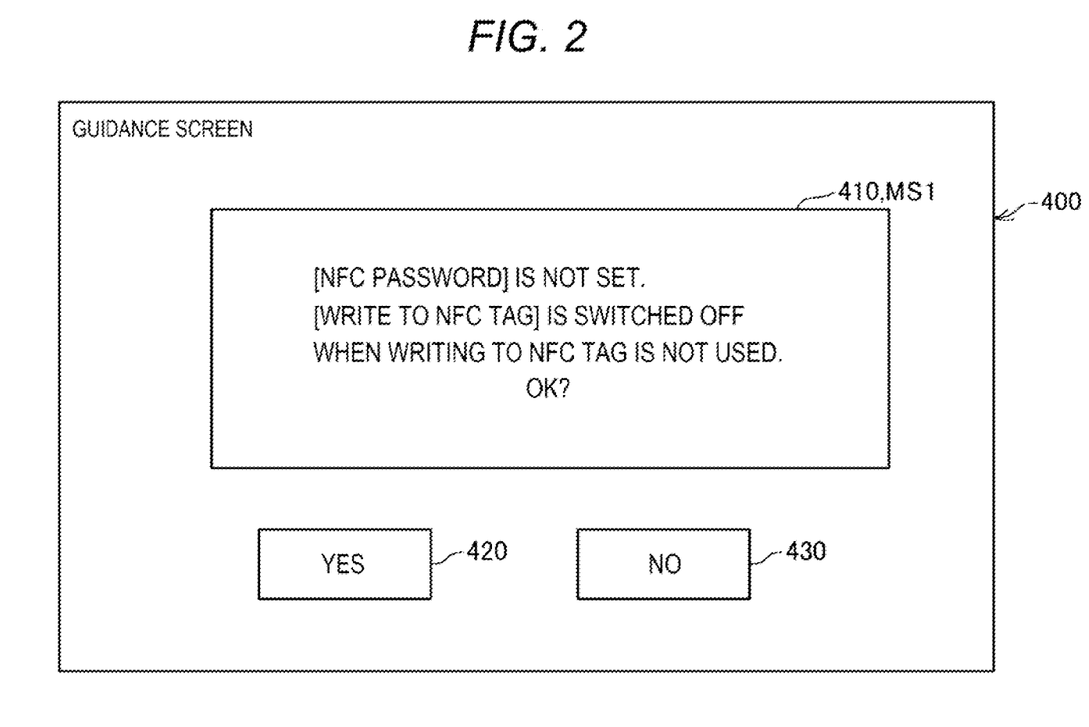
FIG. 2 is a screen view showing an example of a guidance screen.
Figure 3:
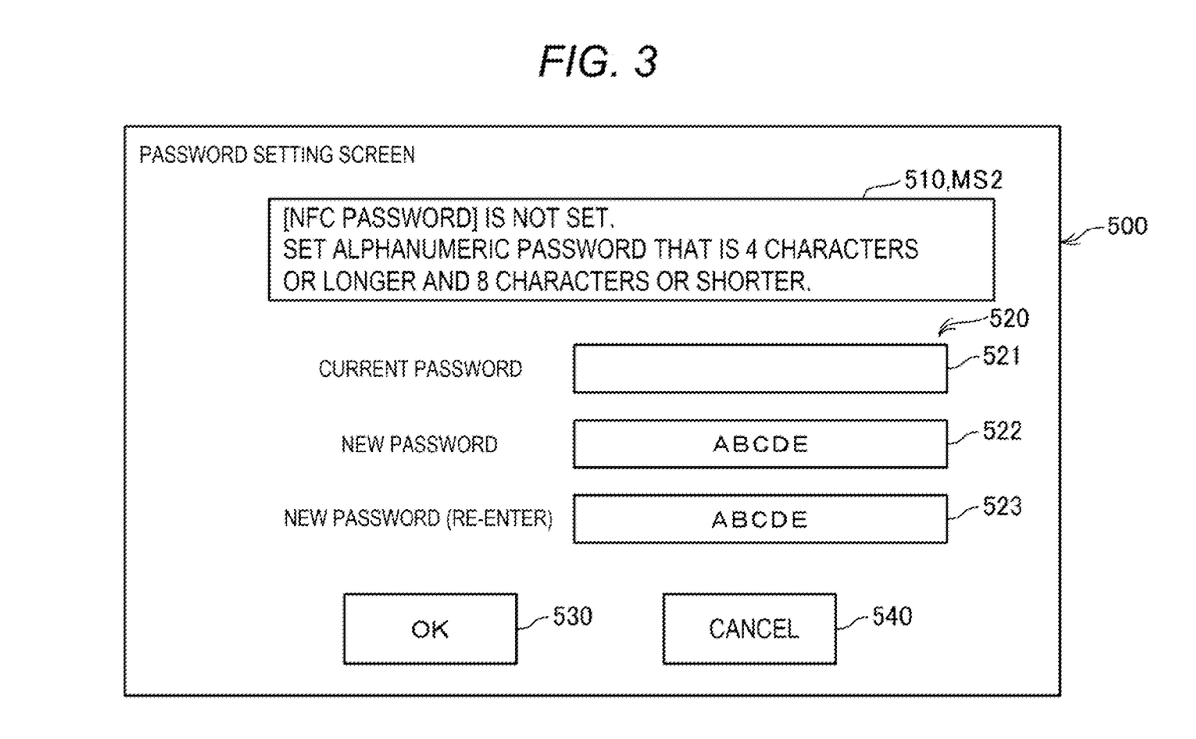
FIG. 3 is a screen view showing an example of a password setting screen.

In this embodiment, the remote controller 5 displays various images including the guidance screen 400 shown in FIG. 2 and the password setting screen 500 shown in FIG. 3 and the projector 200 accepts various operations from the remote controller 5. However, this is not limiting.

For example, the image supply device 100 may display various images including the guidance screen 400 shown in FIG. 2 and the password setting screen 500 shown in FIG. 3 and the projector 200 may accept various operations from the image supply device 100.

Also, for example, the operation unit 231 may display various images including the guidance screen 400 shown in FIG. 2 and the password setting screen 500 shown in FIG. 3 and the projector 200 may accept various operations from the operation unit 231.

The remote control communication unit 233 receives, for example, an infrared signal transmitted from the remote controller 5 and decodes the received infrared signal to generate an operation signal. The remote control communication unit 233 outputs the generated operation signal to the input interface 235. The input interface 235 outputs the operation signal inputted from the remote control communication unit 233 to the control unit 250.

The remote control communication unit 233 also transmits various images to the remote controller 5, for example, in response to an instruction from the control unit 250. The remote control communication unit 233 encodes an image signal inputted from the control unit 250 to generate an infrared signal. The remote control communication unit 233 transmits the generated infrared signal to the remote controller 5.

The storage unit 237 is, for example, a magnetic recording device such as an HDD (hard disk drive) or a storage device using a semiconductor memory element such as a flash memory. The storage unit 237 stores a program executed by the control unit 250, data processed by the control unit 250, image data, and the like.

The image interface 241 is a communication interface executing communication with the image supply device 100, for example, in conformity with the Ethernet (trademark registered) standard. The image interface 241 has a connector for coupling an Ethernet (trademark registered) cable, and an interface circuit processing a signal transmitted through the connector. The image interface 241 is an interface board having the connector and the interface circuit and is coupled to a main board where a processor 253 of the control unit 250, or the like, is installed. Alternatively, the connector and the interface circuit forming the image interface 241 are installed at the main board of the control unit 250. The image interface 241 receives, for example, dynamic image information from the image supply device 100.

The NFC tag 242 is communicatively coupled to the smartphone 300 via short-range wireless communication. The NFC tag 242 stores a password PW and the setting information JS. The setting information JS is readout by the control unit 250 and is set on each part of the projector 200, at the startup of the projector 200.

The setting information JS includes, for example, mode setting information such as a standby mode setting and a sleep mode setting, and network setting information such as a DHCP (Dynamic Host Configuration Protocol) setting and an IP (Internet Protocol) address setting.

The setting information JS is written into the NFC tag 242 in response to an instruction from the smartphone 300.

The password PW is used to determine whether to permit the smartphone 300 to execute the processing of writing the setting information JS into the NFC tag 242 or not. In this embodiment, the initial value of the password PW is set to NULL.

The image processing unit 245 and frame memory 243 can be formed, for example, of an integrated circuit. The integrated circuit includes an LSI (large scale integration), an ASIC (application-specific integrated circuit), and a PLD (programmable logic device). The PLD includes, for example, an FPGA (field-programmable gate array). Also, a part of the configuration of the integrated circuit may include an analog circuit. A combination of a processor and an integrated circuit may be employed as well. The combination of a processor and an integrated circuit is referred to as a micro controller or micro control unit (MCU), an SoC (system-on-a-chip), a system LSI, a chip set or the like.

The image processing unit 245 loads image data inputted from the image interface 241 into the frame memory 243. The frame memory 243 has a plurality of banks. Each bank has a storage capacity for writing one frame of image data. The frame memory 243 is formed, for example, of an SDRAM (synchronous dynamic random-access memory).

The image processing unit 245 performs image processing on the image data loaded in the frame memory 243, such as resolution conversion, resizing, correction of a distortion, shape correction, digital zoom, and adjustment of the color tone and luminance of the image.

The image processing unit 245 also generates a vertical synchronization signal by converting the input frame frequency of a vertical synchronization signal into a drawing frequency. The generated vertical synchronization signal is referred to as an output synchronization signal. The image processing unit 245 outputs the generated output synchronization signal to the light modulation device drive unit 222.

The control unit 250 has a memory 251 and the processor 253.

The memory 251 is a storage device storing a program executed by the processor 253 and data in a non-volatile manner. The memory 251 is formed of a magnetic storage device, a semiconductor memory element such as a flash ROM (read-only memory), or another type of non-volatile storage device. The memory 251 may include a RAM (random-access memory) forming a work area for the processor 253. The memory 251 stores data processed by the control unit 250 and a control program executed by the processor 253.

The processor 253 maybe formed of a single processor. Alternatively, a plurality of processors may function as the processor 253. The processor 253 executes a control program and thus controls each part of the projector 200. For example, the processor 253 outputs an instruction to execute image processing corresponding to an operation accepted by the operation unit 231 and the remote controller 5 and a parameter used for this image processing, to the image processing unit 245. The parameter includes, for example, a geometric correction parameter for correcting a geometric distortion of an image projected on to the screen SC, or the like. The processor 253 also controls the light source drive unit 221 to control the turning on and off of the light source unit 211 and also to adjust the luminance of the light source unit 211.

The memory 251 also stores a kitting setting KT and a first-time startup flag FL.

The kitting setting KT prescribes whether to permit a kitting process or not, at the startup of the projector 200. That is, when the kitting setting KT is on, the kitting process is permitted. When the kitting setting KT is off, the kitting process is not permitted.

The kitting process refers to a process of reading out the setting information JS stored in the NFC tag 242 and configuring a setting on the projector 200, based on the setting information JS. In this embodiment, the kitting setting KT in the initial state is set to be on, which indicates that the kitting process is permitted.

The first-time startup flag FL indicates whether the startup is a first-time startup or not. The first-time startup means that the user starts up the projector 200 delivered from the maker, a rental company or the like, for the first time. In this embodiment, the first-time startup flag FL is on until the first-time startup is done. The first-time startup flag FL is set to be off when the first-time startup is done.

The processor 253 of the control unit 250 executes the control program stored in the memory 251 and thus executes the processing described below at the startup of the projector 200.

The processor 253 determines whether a setting that permits the kitting process is configured or not, based on the kitting setting KT. In other words, the processor 253 determines whether the kitting setting KT is on or not.

The processor 253 also determines whether the password PW is at the initial value or not. The password PW is a password requested to be inputted to the smartphone 300 when the setting information JS is written into the NFC tag 242 from the smartphone 300.

When it is determined that the setting that permits the kitting process is configured and it is determined that the password PW is at the initial value, the user is notified of a warning message MS1 indicating that the setting information JS can be written into the NFC tag 242 by another user. The processor 253 causes the touch panel 51 of the remote controller 5 to display, for example, the guidance screen 400 including the warning message MS1.

The warning message MS1 includes a message prompting a change from the setting that permits the kitting process to a setting that does not permit the kitting process.

The warning message MS1 and the guidance screen 400 will be described later with reference to FIG. 2.

When an input for not making the change from the setting that permits the kitting process to the setting that does not permit the kitting process is accepted, the processor 253 gives a message MS2 to the effect that the password PW should be set. The processor 253 causes the touch panel 51 of the remote controller 5 to display, for example, the password setting screen 500 including the message MS2.

When a setting of the password PW is accepted from the remote controller 5, the processor 253 writes the accepted password PW into the NFC tag 242.

The message MS2 and the password setting screen 500 will be described later with reference to FIG. 3.

At the startup of the projector 200, the processor 253 determines whether the startup is the first-time startup or not, based on the first-time startup flag FL. In other words, when the first-time startup flag FL is on at the startup of the projector 200, the processor 253 determines that the startup is the first-time startup. When the first-time startup flag FL is off, the processor 253 determines that the startup is not the first-time startup.

When it is determined that the startup is the first-time startup, the processor 253 gives the warning message MS1. When it is determined that the startup is not the first-time startup, the processor 253 does not give the warning message MS1. In other words, when it is determined that the startup is the first-time startup, the processor 253 causes the touch panel 51 of the remote controller 5 to display the guidance screen 400. When it is determined that the startup is not the first-time startup, the processor 253 does not cause the touch panel 51 to display the guidance screen 400.

In the case where the password PW is at the initial value when the setting information JS is written into the NFC tag 242 from the smartphone 300, the processor 253 does not request an input of the password PW to the smartphone 300.

In the case where the password PW is not at the initial value when the setting information JS is written into the NFC tag 242 from the smartphone 300, the processor 253 requests an input of the password PW to the smartphone 300.

When the password PW inputted to the smartphone 300 does not match the password PW stored in the NFC tag 242, the writing of the setting information JS to the NFC tag 242 is prohibited. When the password PW inputted to the smartphone 300 matches the password PW stored in the NFC tag 242, the writing of the setting information JS to the NFC tag 242 is permitted.

FIG. 2 is a screen view showing an example of the guidance screen 400.

The guidance screen 400 is displayed on the touch panel 51 of the remote controller 5 by the control unit 250, when it is determined that the startup is the first-time startup, it is determined that the setting that permits the kitting process is configured, and it is determined that the password PW is at the initial value.

The guidance screen 400 includes a first guidance display section 410, a YES button 420, and a NO button 430.

In the first guidance display section 410, the warning message MS1 is displayed. The warning message MS1 indicates that the setting information JS can be written into the NFC tag 242 by another user. The warning message MS1 also includes a message promoting the user to change from the setting that permits the kitting process to the setting that does not permit the kitting process.

In FIG. 2, a message □[NFC PASSWORD] IS NOT SET. [WRITE TO NFC TAG] IS SWITCHED OFF WHEN WRITING TO NFC TAG IS NOT USED. OK?□ is displayed in the first guidance display section 410.

The [NFC PASSWORD] in this message is equivalent to the password PW. The [WRITE TO NFC TAG] is equivalent to the kitting setting KT.

The YES button 420 is touched by the user when switching off the kitting setting KT.

The NO button 430 is touched by the user when not switching off the kitting setting KT.

As described with reference to FIG. 2, the user can switch the kitting setting KT from on to off, using the guidance screen 400. Therefore, even when setting information JS that is not desired by the user is written into the NFC tag 242, the setting information JS is not used for the setting on the projector 200. Thus, a setting on the projector 200 that is not desired by the user can be restrained.

FIG. 3 is a screen view showing an example of the password setting screen 500.

The password setting screen 500 is displayed on the touch panel 51 of the remote controller 5 by the control unit 250 when the NO button 430 in the guidance screen 400 shown in FIG. 2 is touched.

The password setting screen 500 includes a second guidance display section 510, a password input section 520, an OK button 530, and a CANCEL button 540.

In the second guidance display section 510, the message MS2 to the effect that the password PW should be set is displayed. In FIG. 3, a message □[NFC PASSWORD] IS NOT SET. SET ALPHANUMERIC PASSWORD THAT IS 4 CHARACTERS OR LONGER AND 8 CHARACTERS OR SHORTER.□ is displayed in the second guidance display section 510.

The password input section 520 includes a current password display section 521, a new password input section 522, and a new password re-entry section 523.

In the current password display section 521, the set password PW is displayed. However, when the password PW is NULL, the password PW is not displayed in the current password display section 521. In this embodiment, since the initial value of the password PW is NULL, the password PW is not displayed in the current password display section 521.

The new password input section 522 accepts an input of a new password PW. For example, a software keyboard is displayed on the touch panel 51 of the remote controller 5, and the user inputs a new password PW to the new password input section 522, using the displayed software keyboard. When the new password PW is accepted, the accepted password PW is displayed in the new password input section 522. For example, a new password PW □ABCDE□ is displayed in the new password input section 522.

The new password re-entry section 523 accepts a re-entry of a new password PW in order to prevent an input error of the new password PW by the user. When a new password PW is accepted, the accepted password PW is displayed in the new password re-entry section 523. For example, a new password PW □ABCDE□ is displayed in the new password re-entry section 523.

When the password PW inputted in the new password re-entry section 523 does not match the password PW inputted in the new password input section 522, an error message is displayed.

The OK button 530 is touched by the user when setting the password PW inputted in the new password input section 522. When the OK button 530 is touched, the password PW inputted in the new password input section 522 is written into the NFC tag 242.

The CANCEL button 540 is touched by the user when cancelling the password PW inputted in new password input section 522 and the new password re-entry section 523. When the CANCEL button 540 is touched, the password PW displayed in the new password input section 522 and the new password re-entry section 523 is erased.

As described with reference to FIG. 3, the user can set a proper password, using the password setting screen 500. Therefore, the writing of setting information JS that is not desired by the user into the NFC tag 242 can be restrained. Thus, a setting on the projector 200 that is not desired by the user can be restrained.

Figure 4:
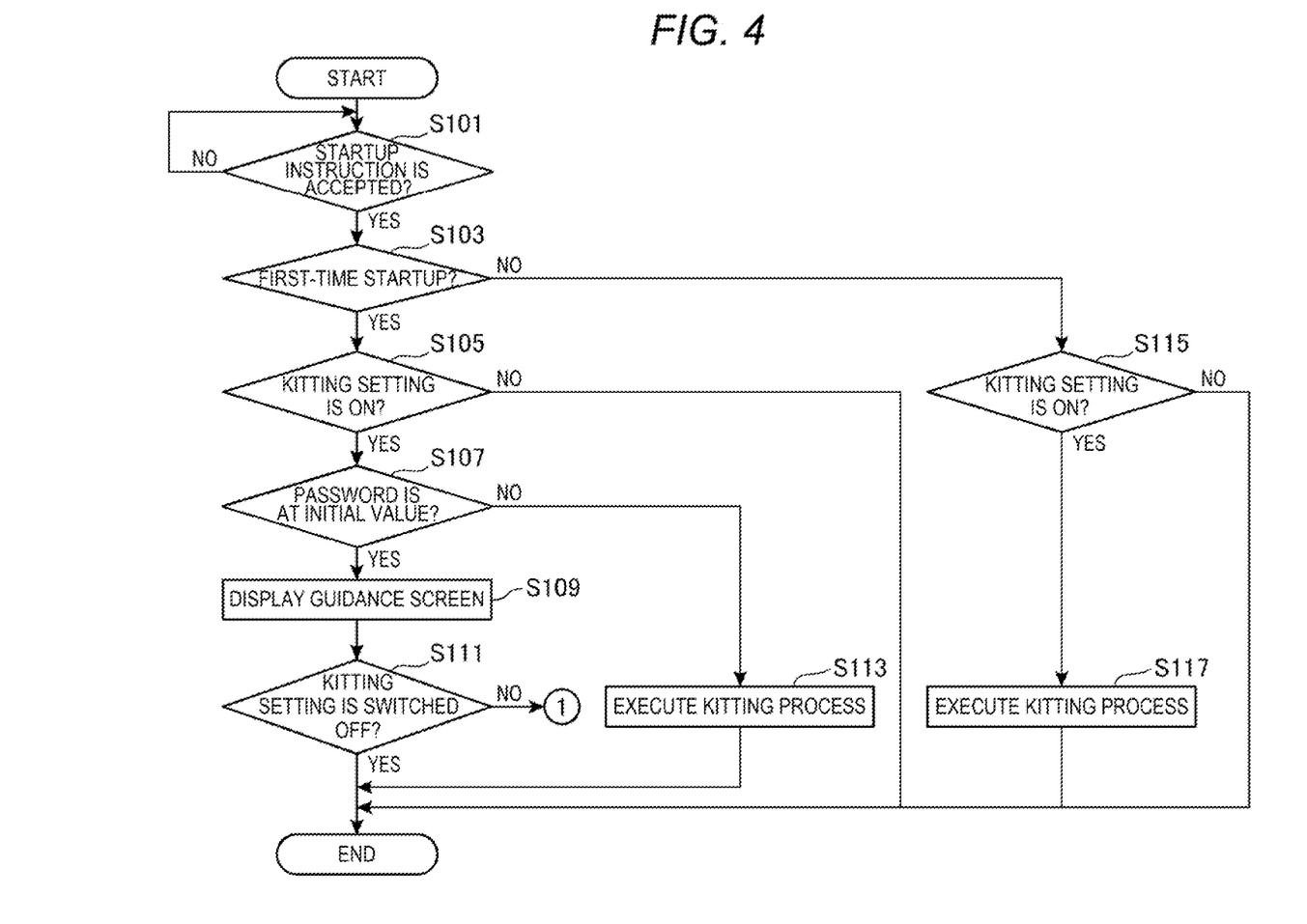
FIG. 4 is a flowchart showing an example of processing by a control unit.
Figure 5:
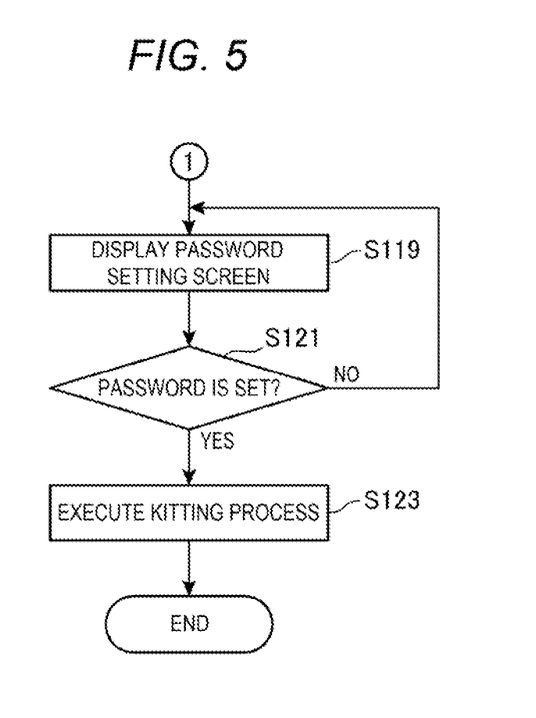
FIG. 5 is a flowchart showing an example of processing by the control unit.

FIGS. 4 and 5 are flowcharts showing an example of processing by the control unit 250.

First, in step S101, the control unit 250 determines whether a startup instruction from the user is accepted or not. The control unit 250 accepts, for example, a press on a startup button arranged in the operation unit 231 and thus accepts a startup instruction.

When the control unit 250 determines that a startup instruction from the user is not accepted (NO in step S101), the processing turns into a standby state. When the control unit 250 determines that a startup instruction from the user is accepted (YES in step S101), the processing proceeds to step S103.

In step S103, the control unit 250 determines whether the startup is the first-time startup or not. For example, when the first-time startup flag FL is on, the control unit 250 determines that the startup is the first-time startup. When the first-time startup flag FL is off, the control unit 250 determines that the startup is not the first-time startup.

When the control unit 250 determines that the startup is not the first-time startup (NO in step S103), the processing proceeds to step S115. When the control unit 250 determines that the startup is the first-time startup (YES in step S103), the processing proceeds to step S105.

In step S105, the control unit 250 determines whether the kitting setting KT is on or not. When the kitting setting KT is on, the kitting process is permitted. When the kitting setting KT is off, the kitting process is not permitted.

When the control unit 250 determines that the kitting setting KT is not on (NO in step S105), the processing ends. When the control unit 250 determines that the kitting setting KT is on (YES in step S105), the processing proceeds to step S107.

In step S107, the control unit 250 determines whether the password PW is at the initial value or not.

When the control unit 250 determines that the password PW is not at the initial value (NO in step S107), the processing proceeds to step S113.

In step S113, the control unit 250 executes the kitting process. Subsequently, the processing ends.

When the control unit 250 determines that the password PW is at the initial value (YES in step S107), the processing proceeds to step S109.

In step S109, the control unit 250 displays the guidance screen 400. The control unit 250 causes, for example, the touch panel 51 of the remote controller 5 to display the guidance screen 400.

Next, in step S111, the control unit 250 determines whether the kitting setting KT is switched off or not.

When the control unit 250 determines that the kitting setting KT is switched off (YES in step S111), the processing ends. When the control unit 250 determines that the kitting setting KT is not switched off (NO in step S111), the processing proceeds to step S119 shown in FIG. 5.

When NO in step S103, the control unit 250 determines whether the kitting setting KT is on or not, in step S115.

When the control unit 250 determines that the kitting setting KT is not on (NO in step S115), the processing ends. When the control unit 250 determines that the kitting setting KT is on (YES in step S115), the processing proceeds to step S117.

In step S117, the control unit 250 executes the kitting process. Subsequently, the processing ends.

When NO in step S111, the control unit 250 displays the password setting screen 500 in step S119, as shown in FIG. 5. For example, the control unit 250 causes the touch panel 51 of the remote controller 5 to display the password setting screen 500.

Next, in step S121, the control unit 250 determines whether the password PW is set or not.

When the control unit 250 determines that the password PW is not set (NO in step S121), the processing returns to step S119. When the control unit 250 determines that the password PW is set (YES in step S121), the processing proceeds to step S123.

In step S123, the control unit 250 executes the kitting process. Subsequently, the processing ends.

As described with reference to FIGS. 4 and 5, when the kitting setting KT is on and the password PW is at the initial value at the initial startup, the guidance screen 400 is displayed and the user is prompted to switch off the kitting setting KT. By switching off the kitting setting KT, the user can restrain a setting on the projector 200 that the user does not desire.

When the user does not switch off the kitting setting KT, the password setting screen 500 is displayed and the user is prompted to set a proper password PW. By setting a proper password PW, the user can restrain the writing of setting information JS that the user does not desired, into the NFC tag 242. Thus, a setting on the projector 200 that is not desired by the user can be restrained.

As described above with reference to FIGS. 1 to 5, the method for controlling the projector 200 according to this embodiment is a method for controlling the projector 200 having the NFC tag 242. The method includes: when the projector 200 is started up, determining whether a setting that permits a kitting process of reading out the setting information JS stored in the NFC tag 242 and configuring a setting on the projector 200 based on the setting information JS is configured (that is, the kitting setting KT is on) or not; determining whether the password PW requested to be inputted to the smartphone 300 is at the initial value or not, when the setting information JS is written into the NFC tag 242 from the smartphone 300; and notifying the user of the warning message MS1 indicating that setting information JS can be written into the NFC tag 242 by another user, when it is determined that the setting that permits the kitting process is configured (that is, the kitting setting KT is on) and it is determined that the password PW is at the initial value.

That is, when it is determined that the kitting setting KT is on and it is determined that the password PW is at the initial value, the user is notified of the warning message MS1 indicating that the setting information JS can be written into the NFC tag 242 by another user.

Therefore, the user can recognize that the setting information JS can be written into the NFC tag 242 by another user. The user can, for example, switch off the kitting setting KT and thus restrain setting information JS that the user does not desire from being used for the setting on the projector 200. Thus, a setting on the projector 200 that is not desired by the user can be restrained.

The warning message MS1 also includes a message prompting a change from the setting that permits the kitting process (that is, the kitting setting KT is on) to the setting that does not permit the kitting process (that is, the kitting setting KT is off).

Therefore, the user can switch off the kitting setting KT and thus restrain setting information JS that the user does not desire from being used for the setting on the projector 200. Thus, a setting on the projector 200 that is not desired by the user can be restrained.

The method for controlling the projector 200 according to the embodiment also includes giving the message MS2 to the effect that the password PW should be set, when an input for not making the change in the kitting setting KT from on to off is accepted from the user.

Therefore, by setting the password PW, the user can restrain the writing of setting information JS that the user does not desire, into the NFC tag 242. Thus, a setting on the projector 200 that is not desired by the user can be restrained.

The method for controlling the projector 200 according to the embodiment also includes, when a setting of a password PW is accepted, writing the accepted password PW into the NFC tag 242.

Since the password PW is written into the NFC tag 242, authentication with the password PW can be executed when inputting the setting information JS from the smartphone 300, even when the power of the projector 200 is off. Thus, the writing of setting information JS that is not desired by the user into the NFC tag 242 can be restrained. Therefore, a setting on the projector 200 that is not desired by the user can be restrained.

The method for controlling the projector 200 according to the embodiment also include determining whether the startup of the projector 200 is the first-time startup or not, when the projector 200 is started up. When it is determined that the startup is the first-time startup, the warning message MS1 is given. When it is determined that the startup is not the first-time startup, the warning message MS1 is not given.

Since the warning message MS1 is not given when the startup is not the first-time startup, the warning message MS1 can be restrained from being displayed a plurality of times. Therefore, the convenience of the user can be improved.

The method for controlling the projector 200 according to the embodiment also includes not requesting the password PW to be inputted to the smartphone 300 in the case where the password PW is at the initial value when the setting information JS is written into the NFC tag 242 from the smartphone 300.

Since the input of the password PW is not requested when the password PW is at the initial value, the time and effort of the user can be saved. Therefore, the convenience of the user can be improved.

The projector 200 according to the embodiment includes the NFC tag 242 and the control unit 250. The control unit 250, when the projector 200 is started up, determines whether a setting that permits a kitting process of reading out the setting information JS stored in the NFC tag 242 and configuring a setting on the projector 200 based on the setting information JS is configured (that is, the kitting setting KT is on) or not. The control unit 250 determines whether the password PW requested to be inputted to the smartphone 300 is at the initial value or not, when the setting information JS is written into the NFC tag 242 from the smartphone 300. The control unit 250 notifies the user of the warning message MS1 indicating that the setting information JS can be written into the NFC tag 242 by another user, when it is determined that the setting that permits the kitting process is configured (that is, the kitting setting KT is on) and it is determined that the password PW is at the initial value.

That is, when it is determined that the kitting setting KT is on and it is determined that the password PW is at the initial value, the user is notified of the warning message MS1 indicating that the setting information JS can be written into the NFC tag 242 by another user.

Therefore, the user can recognize that the setting information JS can be written into the NFC tag 242 by another user. The user can, for example, switch off the kitting setting KT and thus restrain setting information JS that the user does not desire from being used for the setting on the projector 200. Thus, a setting on the projector 200 that is not desired by the user can be restrained.

The display system 1 according to the embodiment includes the projector 200 that has the NFC tag 242 and the control unit 250, and the smartphone 300 that can communicate with the NFC tag 242. The control unit 250, when the projector 200 is started up, determines whether a setting that permits a kitting process of reading out the setting information JS stored in the NFC tag 242 and configuring a setting on the projector 200 based on the setting information JS is configured (that is, the kitting setting KT is on) or not. The control unit 250 determines whether the password PW requested to be inputted to the smartphone 300 is at the initial value or not, when the setting information JS is written into the NFC tag 242 from the smartphone 300. The control unit 250 notifies the user of the warning message MS1 indicating that the setting information JS can be written into the NFC tag 242 by another user, when it is determined that the setting that permits the kitting process is configured and it is determined that the password PW is at the initial value.

That is, when it is determined that the kitting setting KT is on and it is determined that the password PW is at the initial value, the user is notified of the warning message MS1 indicating that the setting information JS can be written into the NFC tag 242 by another user.

Therefore, the user can recognize that the setting information JS can be written into the NFC tag 242 by another user. The user can, for example, switch off the kitting setting KT and thus restrain setting information JS that the user does not desire from being used for the setting on the projector 200. Thus, a setting on the projector 200 that is not desired by the user can be restrained.

The foregoing embodiment is a preferred embodiment. However, the present disclosure is not limited to the foregoing embodiment and can be implemented with various modifications without departing from the spirit and scope of the present disclosure.

In the embodiment, the case where the RF tag is the NFC tag 242 is described. However, this is not limiting. The RF tag may be, for example, a UHF (ultra-high-frequency) tag.

In the embodiment, the case where the information processing device is the smartphone 300 is described. However, this is not limiting. The information processing device may be any information device that can communicate with an RF tag such as the NFC tag 242. The information processing device may be, for example, a tablet terminal or a laptop personal computer.

In the embodiment, the guidance screen 400 is displayed, when it is determined that the startup is the first-time startup, it is determined that the setting that permits the kitting process is configured, and it is determined that the password PW is at the initial value. However, this is not limiting.

For example, the kitting process may be executed, when it is determined that the startup is the first-time startup and it is determined that the setting that permits the kitting process is configured. In this case, the user can execute the kitting process and set the password PW by the kitting process, only at the first-time startup. Therefore, the load of setting the password PW on the projector 200 can be reduced.

Also, the kitting setting KT may be switched from on to off, without displaying the guidance screen 400. In this case, the state where setting information JS that is not desired by the user is used for the setting on the projector 200 can be restrained.

Each functional unit shown in FIG. 1 represents a functional configuration and the specific installation form thereof is not particularly limited. That is, pieces of hardware corresponding to respective functional units need not be installed. A single processor can execute a program to implement the functions of a plurality of functional units. Also, a part of the functions implemented by software in the embodiment may be implemented by hardware, and a part of the functions implemented by hardware may be implemented by software. Also, specific details of the configuration of each of the other parts of the projector 200 can be arbitrarily changed without departing from the spirit and scope of the present disclosure.

The processing steps in the flowcharts shown in FIGS. 4 and 5 are provided by dividing the processing according to main processing content in order to facilitate the understanding of the processing by the control unit 250. The way the processing is divided into processing steps and the names of the processing steps shown in the flowcharts of FIGS. 4 and 5 are not limiting. Depending on the processing content, the processing can be divided into more processing steps and one processing step can be divided to include more processes. Also, the processing order in the flowcharts is not limited to the illustrated example.

The method for controlling the projector 200 can be implemented by causing the processor 253 provided in the projector 200 to execute a control program corresponding to the method for controlling the projector 200. This control program can be recorded in a computer-readable recording medium. As the recording medium, a magnetic or optical recording medium, or a semiconductor memory device can be used. Specifically, a portable recording medium such as a flexible disk, an HDD, a CD-ROM (compact disk read-only memory), a DVD, a Blu-ray (trademark registered) disc, a magneto-optical disk, a flash memory or a card-type recording medium, or a fixed recording medium may be employed. The recording medium may also be a non-volatile storage device such as a RAM, a ROM or an HDD that is an internal storage device provided in the projector 200. The control program corresponding to the method for controlling the projector 200 can also be stored in advance in a server device or the like, and the control program can be downloaded from the server device to the projector 200, thus implementing the method for controlling the projector 200.

What is claimed is:

1. A method for controlling a projector, the method comprising:
    determining, when the projector having an RF tag is started up, whether a setting that permits a process of reading out setting information stored in the RF tag and configuring a setting on the projector based on the setting information is configured or not;
    determining whether a password requested to be inputted to an information processing device is at an initial value or not, when the setting information is written into the RF tag from the information processing device; and
    notifying a user of a warning message when it is determined that the setting that permits the process is configured and it is determined that the password is at the initial value.

2. The method for controlling the projector according to claim 1, wherein
    the warning message includes a message prompting a change from the setting that permits the process to a setting that does not permit the process.

3. The method for controlling the projector according to claim 2, further comprising:
    giving a message requesting an operation of setting the password to a value that is not the initial value, when an input for not making the change is accepted from a user.

4. The method for controlling the projector according to claim 3, further comprising:
    when the operation of setting the password to the value that is not the initial value is accepted, writing the password based on the operation into the RF tag.

5. The method for controlling the projector according to claim 1, further comprising:
    determining whether the startup of the projector is a first-time startup or not, when the projector is started up, wherein
    when it is determined that the startup is the first-time startup, the warning message is given, and when it is determined that the startup is not the first-time startup, the warning message is not given.

6. The method for controlling the projector according to claim 1, further comprising:
    not requesting the password to be inputted to the information processing device in the case where the password is at the initial value when the setting information is written into the RF tag from the information processing device.

7. A projector comprising:
    an RF tag; and
    one or more processors programmed to:
        determine, when the projector is started up, whether a setting that permits a process of reading out setting information stored in the RF tag and configuring a setting on the projector based on the setting information is configured or not,
        determine whether a password requested to be inputted to an information processing device is at an initial value or not, when the setting information is written into the RF tag from the information processing device, and
        notify a user of a warning message when it is determined that the setting that permits the process is configured and it is determined that the password is at the initial value.

8. A display system comprising:
    a projector having an RF tag and one or more processors; and
    an information processing device that can communicate with the RF tag, wherein
    the processors programmed to:
    determine, when the projector is started up, whether a setting that permits a process of reading out setting information stored in the RF tag and configuring a setting on the projector based on the setting information is configured or not, determine whether a password requested to be inputted to the information processing device is at an initial value or not, when the setting information is written into the RF tag from the information processing device, and notify a user of a warning message when it is determined that the setting that permits the process is configured and it is determined that the password is at the initial value.

\* \* \* \* \*